Figure 1:
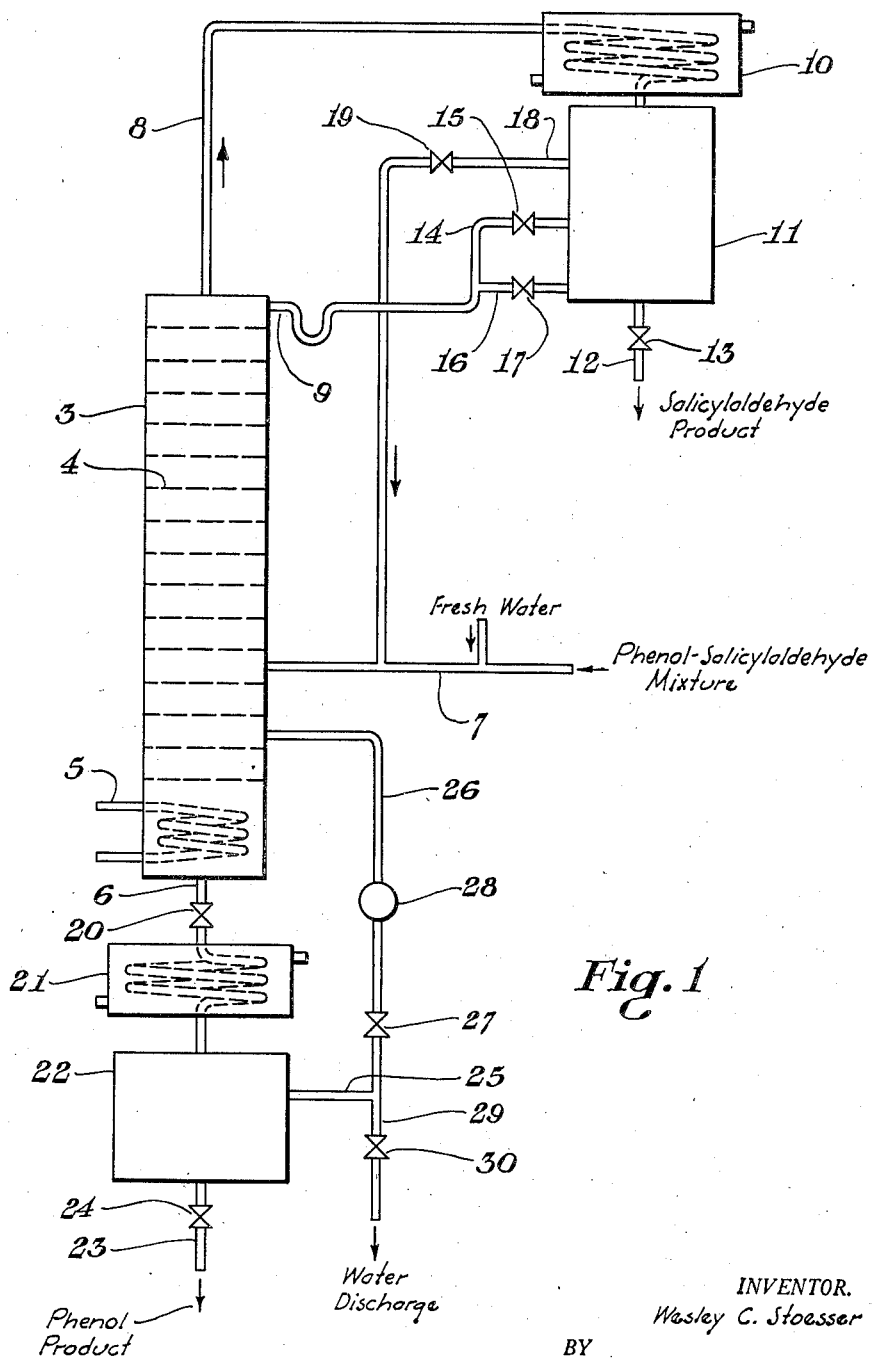

March 21, 1944.   W. C. STOESSER   2,344,791
SEPARATION OF PHENOL FROM SALICYLALDEHYDE
Filed April 1, 1942   2 Sheets-Sheet 1

INVENTOR.
Wesley C. Stoesser
BY
Griswold & Burdick
ATTORNEYS

UNITED STATES PATENT OFFICE 2,344,791

SEPARATION OF PHENOL FROM SALICYLALDEHYDE

Wesley C. Stoesser, Midland, Mich., assignor to The Dow Chemical Company, Midland, Mich., a corporation of Michigan Application April 1, 1942, Serial No. 437,128

4 Claims. (Cl. 202—42)

This invention is concerned with the removal of salicylaldehyde from a mixture thereof with phenol.

Salicylaldehyde is ordinarily made by the reaction of phenol, chloroform, and sodium hydroxide (Reimer-Tiemann reaction) to produce essentially salicylaldehyde, p-hydroxy-benzaldehyde, water, sodium chloride, and unreacted phenol. The salicylaldehyde is readily separated, e. g. by distillation, from the other products with the exception of the phenol, the removal of which has to date been very unsatisfactory. The removal of phenol from salicylaldehyde has been attempted by a series of water extractions. However, the salicylaldehyde recovered by this method has a purity of only 70 per cent under the most economical operation and at best only about 90 per cent, and in either case the phenol is so diluted with water that considerable evaporation is necessary for its economic recovery. Another method, precipitation of the salicylaldehyde as a calcium salt, is unsatisfactory because of the loss of salicylaldehyde due to the significant solubility of the calcium salt. A third method, found practical only on a laboratory scale, is to form a sodium acid sulfite addition compound with the salicylaldehyde, the addition product being more readily separable than the salicylaldehyde.

It is, therefore, an object of this invention to provide a method of separating phenol from salicylaldehyde in such manner that the latter may be obtained in substantially pure form, i. e. at least 98 per cent pure. It is a further object to provide a method whereby the phenol may be obtained in a state of purity in which it can be returned to the Reimer-Tiemann reaction described above.

I have found that the result of the distillation of a phenol-salicylaldehyde mixture is considerably affected by the presence of water in the mixture. In an anhydrous distillation the vapors are enriched in phenol. However, the presence of water increases the tendency of the salicylaldehyde to vaporize by forming an azeotrope therewith, and even in the presence of a relatively small proportion of water the vapors are enriched in salicylaldehyde. Further, the relative vapor enrichment in salicylaldehyde is somewhat proportional to the proportion of water added; and when this proportion is relatively large, e. g. 80 per cent of the entire mixture, a very sharp separation of salicylaldehyde can be effected by fractional distillation. Although I prefer that the water constitute at least 80 per cent by weight of the entire mixture, a lesser proportion can be used. However, the water must be present in an amount at least about four times the weight of salicylaldehyde present in order to remove all the salicylaldehyde in the form of its water azeotrope.

The invention then comprises the steps of diluting the phenol-salicylaldehyde mixture with water until the weight of water present is at least four times that of the salicylaldehyde, and preferably 80 per cent of the entire mixture, vaporizing the diluted mixture; dephlegmating the vapors; condensing the evolved water-salicylaldehyde azeotrope; returning as reflux a portion of the condensate, the water and salicylaldehyde therein being in substantially the azeotropic proportions; and removing phenol and excess water from the bottom of the dephlegmator.

Figure 2:
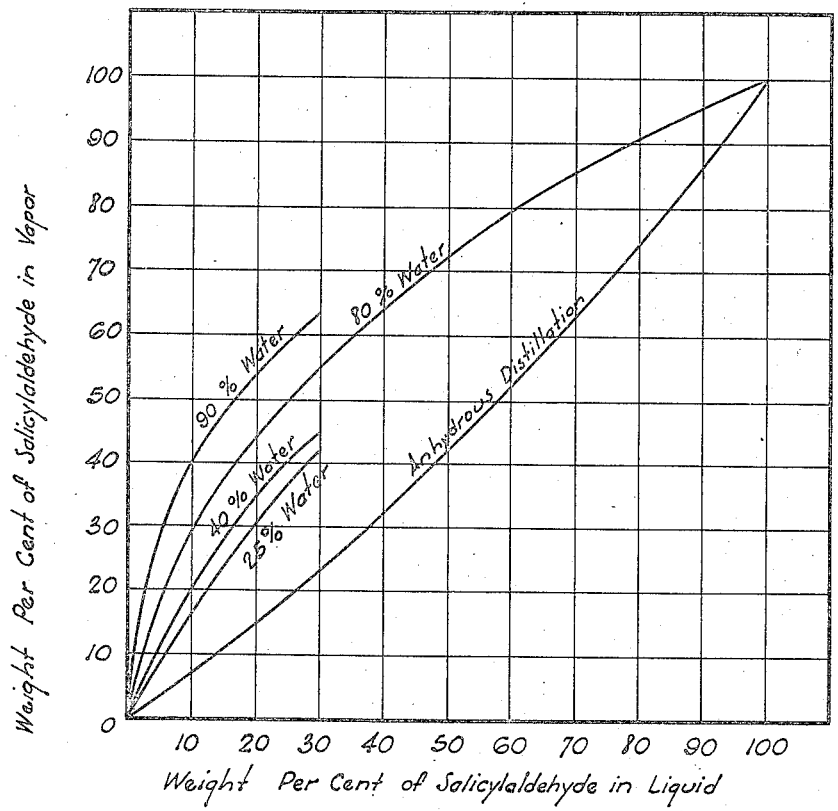

A preferred mode of operation is illustrated in the accompanying drawings wherein Fig. 1 shows diagrammatically an apparatus suitable for the carrying out of the invention and Fig. 2 shows graphically the relative effects of various percentages of water on the efficiency of the distillation.

Referring now to the drawings: In Fig. 1 a distillation column 3, having a plurality of plates 4, has at its bottom end a suitable heating means, such as a steam coil 5, and a drain 6 for nonvaporized material. The column 3 is provided at a point several plates from the bottom with an inlet pipe 7 for material to be purified and at the top by a vapor tube 8 and a reflux pipe 9. The vapor tube 8 for distilled vapors leads through a condenser 10 to a decanter 11. A drain 12, containing a valve 13, is attached to the bottom of the decanter 11 and serves to remove the purified salicylaldehyde. The decanter 11 is also provided with a water reflux pipe 14, containing a valve 15; a salicylaldehyde reflux pipe 16, containing a valve 17; and an overflow line 18, containing a valve 19, for returning water to the inlet pipe 7.

The drain 6 for nonvaporized material leads through a valve 20 to a cooler 21 and then to a decanter 22. The decanter 22 is provided with a phenol outlet pipe 23, containing a valve 24, and is also provided with a water-return line 25. The water-return line 25 is connected to a pipe 26 which leads through a valve 27 and a pump 28 to a lower end of the distillation column 3. The water-return line 25 is also connected to a pipe 29, containing a valve 30, by which water may be discharged.

In accordance with the preferred embodiment of the invention, a mixture of phenol and salicylaldehyde, such as is obtained during the manufacture of the latter, is diluted with 4 times its weight of water. The resultant mixture is then introduced into the distillation column at a point several plates from the bottom where a part of the mixture is vaporized. As the vaporized material moves up the column, the successive condensations and re-evaporations on the plates of the column causes the composition of the vapor to approach the water-salicylaldehyde azeotrope. After suitable dephlegmation, it is this azeotrope—about 80 per cent water and about 20 per cent salicylaldehyde—which is finally evolved at a temperature of about 98.4° C. The vapors of the water-salicylaldehyde azeotrope are condensed and passed into a decanter where the condensate separates into a water layer and a salicylaldehyde layer, the latter comprising substantially pure salicylaldehyde, i. e. salicylaldehyde of at least 98 per cent purity. Portions of the water and salicylaldehyde are returned as reflux, the proportions of the two being preferably that of the azeotropic mixture. However, an excess of water may be used in the reflux if desired. Any part of the water layer not used as reflux may be returned to the feed and that part of the salicylaldehyde not used as reflux is removed as the purified product.

Although the phenol-water azeotrope—about 9.4 weight per cent phenol and about 90.6 weight per cent water—has a boiling point only a fraction of a degree higher than that of the water-salicylaldehyde azeotrope, about 99° C. and about 98.4° C. respectively, a very sharp separation of the phenol and salicylaldehyde is obtained. Thus, the material moving down the column below the inlet pipe contains substantially all the phenol together with any water which may be present in excess of that necessary to form the water-salicylaldehyde azeotrope. However, the water in the distillation column, whether added via the feed or otherwise, may be just sufficient to satisfy the water-salicylaldehyde azeotrope, in which case the material reaching the bottom of the column will be substantially anhydrous phenol. The liquid drained from the bottom of the column is passed through a cooler where water, if present in excess of the solubility of water in phenol at the temperature of the mixture, separates from the phenol. The water layer may be returned to the distillation column preferably at a point below the inlet pipe for the phenol-salicylaldehyde mixture.

The importance of diluting the phenol-salicylaldehyde mixture can be illustrated in the form of a graph. This is shown in Figure 2 of the accompanying drawings. The graph is a plot of the weight per cent of the salicylaldehyde in the phenol-salicylaldehyde liquor versus the weight per cent of the salicylaldehyde in the vapor at the boiling points of the mixtures and with various concentrations of water. The weight percentages of salicylaldehyde are based on just the salicylaldehyde and phenol present, whereas the weight per cent of water is based on the entire mixture. For comparison of the relative effects of various concentrations of water, a typical feed composition of 30 per cent salicylaldehyde may be considered. This comparison shows that in the initial vaporization (before contact with the plates) the concentration of salicylaldehyde in the vapor from a 30 per cent anhydrous mixture is about 23 per cent, i. e. a decrease in salicylaldehyde and a corresponding enrichment of the vapor in phenol. On the other hand, if similar salicylaldehyde mixtures are diluted until they contain 25, 40, 80, or 90 per cent of water, the proportion of salicylaldehyde in the vapor increases to about 42, 45, 55, or 63 per cent respectively. Thus, in carrying out the distillation of a salicylaldehyde-phenol-water mixture containing, for example, 80 per cent water, successive condensations and re-evaporations on only a very few plates of a distillation column are necessary to obtain a sharp separation of the salicylaldehyde and phenol.

The invention may be more clearly understood by reference to a particular detailed example which has been carried out in accordance with the principles of the invention. The details are given for purposes of clarity and with no intent to limit the invention.

*Example*

A composition consisting essentially of 16.4 weight per cent salicylaldehyde, 65.6 weight per cent phenol, and 18.0 weight per cent water was diluted until it contained 80 weight per cent water. The diluted composition was fed on the eighth plate (from the bottom) of a 24-plate column heated by means of a steam coil below the bottom plate. The rate of feed and the amount of heat supplied to the column were both adjusted to secure suitable vaporization of the diluted mixture and the constant evolution of the water-salicylaldehyde azeotrope from the top of the column. The vapors of the azeotrope, evolved at a temperature of about 98.4° C., were condensed and passed into a decanter, where a water layer and a salicylaldehyde layer formed. Portions of the water layer and the salicylaldehyde layer were returned as reflux to the top of the column, the water constituting about 83 per cent of the reflux liquor and the reflux ratio being about 4.5-1. The salicylaldehyde product was approximately 98 per cent pure. The phenol and excess water were drained from the bottom of the column, cooled, and passed into a decanter. The phenol layer which separated was found to contain 67 per cent phenol and 33 per cent water.

This application is a continuation-in-part of my copending application Serial No. 371,766, filed December 26, 1940.

I claim:

1. The method of separating salicylaldehyde from a mixture thereof with phenol which comprises the steps of diluting the phenol-salicylaldehyde mixture with water until the weight of water present is at least 4 times that of the salicylaldehyde; vaporizing the diluted mixture; dephlegmating the vapors; condensing the evolved water-salicylaldehyde azeotrope; returning as reflux a portion of the condensate, the water and salicylaldehyde therein being in substantially azeotropic proportions; permitting the balance of the condensate to separate into a water layer and a salicylaldehyde layer; returning the water layer to the column; and removing the salicylaldehyde layer.

2. The method of separating salicylaldehyde from a mixture thereof with phenol which comprises the steps of diluting the phenol-salicylaldehyde mixture with water until the total mixture contains at least 80 weight per cent water, vaporizing the diluted mixture, dephlegmating the vapors, condensing the evolved water-salicylaldehyde azeotrope, returning as reflux a portion of the condensate, the water therein being in a proportion at least equal to that of the azeotrope; permitting the balance of the condensate to separate into a water layer and a salicylaldehyde layer; returning the water layer to the column; and removing the salicyladehyde layer.

3. The method of separating salicylaldehyde from a mixture thereof with phenol which comprises the steps of diluting the phenol-salicylaldehyde mixture with water until the weight of water present is at least 4 times that of the salicylaldehyde; vaporizing the diluted mixture; dephlegmating the vapors; condensing the evolved water-salicylaldehyde azeotrope; returning as reflux a portion of the condensate, the water being in a proportion at least equal to that of the azeotrope; permitting the balance of the condensate to separate into a water layer and a salicylaldehyde layer; returning the water layer to the column; and removing the salicylaldehyde layer.

4. The method of separating salicylaldehyde from a mixture thereof with phenol which comprises adding water to the salicylaldehyde-phenol mixture in amount by weight of at least 4 times that of the salicylaldehyde in the mixture; fractionally distilling the diluted mixture to obtain as condensate the azeotropic mixture of water and salicylaldehyde; returning as reflux to the distillation a portion of the condensate, the water therein being in a proportion at least equal to that of the azeotrope; permitting the balance of the condensate to separate into a water layer and a salicylaldehyde layer; returning the water layer to the column; and removing the salicylaldehyde layer.

WESLEY C. STOESSER.